United States Patent Office.

HENRI RAYMOND VIDAL, OF PARIS, FRANCE.

SUBSTANTIVE SULFUR DYE AND PROCESS OF MAKING SAME.

SPECIFICATION forming part of Letters Patent No. 630,952, dated August 15, 1899.

Application filed June 27, 1898. Serial No. 684,621. (Specimens.)

*To all whom it may concern:*

Be it known that I, HENRI RAYMOND VIDAL, a citizen of the Republic of France, and a resident of Paris, France, have invented a new and useful Improvement in Substantive Sulfur Dyes, which is fully set forth in the following specification.

I have found that certain dihydroxylated azo bodies, such as those resulting from the copulation of one or two molecules of diazo benzene with the resorcin, when heated with sulfur in the presence of alkaline sulfids give coloring-matters dyeing directly the vegetable fibers in dark shades. As an example, I heat on an oil-bath in a cast-iron pan provided with an agitator for about five hours at a temperature of about 220° to 280°, first, the product resulting from the copulation of one molecule of diazo benzene with one molecule of resorcin, 21.500 kilos; second, sulfid of sodium, thirty kilos; third, sulfur, eight kilos. During the operation water is added to the mass from time to time until the azo body is completely reduced. When by disappearance of the orange color of the azo body this reduction is shown to be complete, no more water is added, and heat is applied until the mass is entirely desiccated. The product appears in the form of a black brittle mass soluble in water and dyeing in this condition the unmordanted cotton in a dark shade.

In the preceding reaction I may substitute for the product resulting from the copulation of one molecule of resorcin with one molecule of diazo benzene the corresponding product resulting from the copulation of two molecules of diazo benzene with one molecule of resorcin. In this case I double the quantity of sulfur and sulfid.

I may obviously replace in the foregoing examples the two azo bodies of resorcin by the products resulting from the copulation of one or two molecules of diazo benzene or of an aromatic amin similar to the dioxynaphtalenes capable of reacting like resorcin. As an example, I heat on an oil-bath in a cast-iron pan provided with an agitator for about five hours at a temperature of about 220° to 280°, first, dioxynaphtalene, two to seven parts, copulated with one molecule of diazo benzene, 26.500 kilos; second, sulfid of sodium, thirty-five kilos; third, sulfur, eight kilos. During the operation water is, as before, added to the mass from time to time until the azo body is completely reduced. Heat is then applied until the mass is entirely desiccated. The product appears in the form of a black brittle mass soluble in water and dyeing in this condition the unmordanted cotton in a dark shade.

It is to be understood that in the boiling with sulfur and sulfid I may use instead of the above-mentioned compounds the amidoresorcin and diamidoresorcin as well as the amidodioxynaphtalenes and diamidodioxynaphtalenes, which are the products resulting from the reduction of the above-named corresponding azo bodies and which form in the reaction as intermediary products.

What I claim is—

1. The process of manufacturing coloring-matters capable of dyeing unmordanted cotton in dark shades, which process consists in heating a dihydroxylated azo body with sulfur in the presence of an alkaline sulfid, substantially as described.

2. The described coloring-matters derived from the specified dihydroxylated azo bodies by heating with sulfur in the presence of alkaline sulfid, said coloring-matters being a black, brittle mass, soluble in water, and dyeing in this condition unmordanted cotton a dark shade, substantially as described.

In testimony whereof I have signed this specification in the presence of two subscribing witnesses.

HENRI RAYMOND VIDAL.

Witnesses:
   EDWARD P. MACLEAN,
   ANTOINE ROUSSANNES, Jr.